(12) United States Patent
Suzuki et al.

(10) Patent No.: US 8,933,141 B2
(45) Date of Patent: Jan. 13, 2015

(54) ACTIVE ENERGY RAY-CURABLE INKJET INK COMPOSITION

(75) Inventors: Norio Suzuki, Tokyo (JP); Kazuhiro Jonai, Tokyo (JP); Mayuko Okamoto, Tokyo (JP); Yuji Kameyama, Tokyo (JP); Yohei Konda, Tokyo (JP)

(73) Assignees: Toyo Ink SC Holdings Co., Ltd., Tokyo (JP); Toyo Ink Co., Ltd., Tokyo (JP)

( * ) Notice: Subject to any disclaimer, the term of this patent is extended or adjusted under 35 U.S.C. 154(b) by 182 days.

(21) Appl. No.: 13/434,195

(22) Filed: Mar. 29, 2012

(65) Prior Publication Data

US 2012/0252919 A1 Oct. 4, 2012

(30) Foreign Application Priority Data

Mar. 29, 2011 (JP) ................. 2011-072491

(51) Int. Cl.
 C08F 2/46 (2006.01)
 C08J 3/28 (2006.01)
 C09D 11/18 (2006.01)
 C09D 11/101 (2014.01)

(52) U.S. Cl.
 CPC ........... *C09D 11/101* (2013.01); *Y10S 522/904* (2013.01); *Y10S 522/909* (2013.01)
 USPC ............. 522/35; 522/34; 522/71; 522/81; 522/113; 522/121; 522/120; 522/178; 522/904; 522/182; 522/909

(58) Field of Classification Search
 USPC ......... 522/182, 34, 35, 71, 81, 113, 121, 120, 522/178, 904
 See application file for complete search history.

(56) References Cited

U.S. PATENT DOCUMENTS

| | | | | |
|---|---|---|---|---|
| 8,563,642 B2 * | 10/2013 | Buri et al. | .................. | 524/425 |
| 2003/0189626 A1 | 10/2003 | Kataoka et al. | | |
| 2009/0280302 A1 | 11/2009 | Fukumoto et al. | | |
| 2010/0302300 A1 | 12/2010 | Verdonck | | |
| 2010/0331478 A1 | 12/2010 | Claes | | |
| 2011/0224324 A1 | 9/2011 | Loccufier et al. | | |
| 2012/0003435 A1 | 1/2012 | Kameyama et al. | | |
| 2012/0108746 A1 | 5/2012 | Claes | | |

FOREIGN PATENT DOCUMENTS

| | | |
|---|---|---|
| CN | 101835855 A | 9/2010 |
| EP | 2 199 273 A1 | 6/2010 |
| JP | 2000-141708 | 5/2000 |
| JP | 2004-263049 | 9/2004 |
| JP | 2007-31667 | 2/2007 |
| JP | 2007-291399 | 11/2007 |

OTHER PUBLICATIONS

D. Helsby. POlymeric Photoinitiator: Low Migration, Low Oder, Favorable Toxicology. Retrieved online on {Jun. 13, 2014], Retrieved from internet <URL:http://www.radtechmembers.org/2012-Papers/2012/papers/Session%2016%20-%20Photoinitiators/DHelsby_RAHN.pdf>.*
Extended European Search Report issued Jun. 29, 2012 in Patent application No. 12161979.5.
U.S. Appl. No. 14/008,926, filed Oct. 23, 2013, Suzuki, et al.
Combined Chinese Office Action and Search Report issued on Aug. 21, 2014, in Patent Application No. 201210088903.0 with English translation.

* cited by examiner

*Primary Examiner* — Sanza McClendon
(74) *Attorney, Agent, or Firm* — Oblon, Spivak, McClelland, Maier & Neustadt, L.L.P.

(57) ABSTRACT

An ink composition which is used for active energy ray-curable inkjet printing, has excellent curability or adhesiveness to multiple base materials while having low viscosity, and exhibits excellent non-yellowing properties of the printed matter is provided. The composition comprises a polymerizable monomer (A) and photopolymerization initiators (B), the polymerizable monomer comprising 2-(2-vinyloxyethoxy)ethyl acrylate (A-1), and the photopolymerization initiators comprising oligo(2-hydroxy-2-methyl-1-(4-(1-methylvinyl)phenyl)propanone) (B-1) and other initiator (B-2).

5 Claims, No Drawings

ACTIVE ENERGY RAY-CURABLE INKJET INK COMPOSITION

TECHNICAL FIELD

The present invention relates to an active energy ray-curable inkjet composition.

BACKGROUND ART

An inkjet printing system is characterized in that recording of images or characters is performed by attaching liquid microdroplets of an ink composition to a base material to be printed on (hereinafter, referred to as "printing base material"), and thereby no printing plate is used in the process of printing. As another printing system which does not use any printing plate, an electrophotographic system is also well known. However, from the viewpoints of equipment cost, running cost, printing speed and the like, the inkjet printing system is considered to be superior so that there has been an increase in the market demand for on-demand printing in recent years, and the demand is even further expanding.

As the ink compositions that are conventionally used in the inkjet printing system, a wide range of types such as a solvent type, an aqueous type, and an active energy ray-curable type are available. Among these, active energy ray-curable type ink compositions have an advantage that since the printed matter can be immediately cured and dried by irradiation of an active energy ray after printing, the printing speed is superior as compared with solvent type or aqueous type ink compositions, which essentially require an ink drying process. In addition to that, active energy ray-curable type ink compositions have many advantages, such as that there are available many base materials that can accommodate the use, such as non-absorptive base materials such as plastics and glass or paper base materials, and that the amounts of solvent volatilization are reduced, thus making the system environment-friendly. Therefore, it is the current situation that even in the inkjet printing system, the demand for the active energy ray-curable type ink compositions is ever increasing in recent years.

In order to cope with these demands, an active energy ray-curable ink composition is required to have drying properties and curability that are appropriate for realizing an excellent printing speed without depending on the print thickness of the printed matter or the coverage rate. Furthermore, an active energy ray-curable ink composition is required to have base material versatility for accommodating printing on various base materials. Also, an active energy ray-curable ink composition is required to have qualities such as non-yellowing properties for preventing any color change before and after curing. In order for an ink composition to be used for inkjet printing, it is an essential condition that the ink composition has a low viscosity.

However, while it is definitely natural to use a color ink composition in the inkjet printing system, there are occasions in which a colorless transparent clear ink composition is used in recent years. The purpose of using the clear ink composition may vary in a wide range, and the clear ink composition is used, for example, in the case of performing printing on top of a printed matter of color ink composition, and imparting a glossy feeling or a matte feeling to the surface of the printed matter to thereby enhance the design of the printed matter; in the case of printing characters with a high print thickness on the base material, and thereby producing a three-dimensional printed matter such as Braille; or in the case of directly performing printing in advance using a clear ink composition on a penetrable base material such as a paper base material, and then performing printing on top of a printed matter using a color ink composition to thereby prevent penetration into the base material, bleeding or the like and to obtain high quality images irrespective of the base material. Japanese Patent Application Laid-Open (JP-A) No. 2000-141708 discloses an example of the inkjet printing system including a clear ink composition.

There have been hitherto reports on the method for inkjet printing including a clear ink composition using various systems of inkjet ink compositions such as described above. For example, JP-A Nos. 2004-263049 and 2007-291399 discuss examples of inkjet printing methods of imparting glossiness to a printed matter by performing printing with an aqueous type clear ink composition on top of an aqueous type color ink printed matter. However, in the case of an aqueous type ink composition, since an ink drying step after printing is necessary as described above, there is a problem that the printing speed deteriorates.

Furthermore, JP-A No. 2007-031667 discloses an example of an active energy ray-curable type clear ink composition, by which it is intended to enhance the print quality by controlling the viscosity and surface tension of the ink composition and thereby preventing cissing on the color ink printed matter. However, the Examples describe only the case of performing printing on a color ink printed matter, and the case of directly printing on a base material as described above is not taken into consideration. Furthermore, the inventors of the present invention attempted a simulation experiment, which resulted in that the printed matter turned yellowish, and printed matters having poor non-yellowing properties were obtained.

As discussed above, it is the current situation that an active energy ray-curable inkjet ink composition, particularly a clear ink composition, which satisfies all of curability, base material versatility and non-yellowing properties, has not yet been obtained.

CITATION LIST

Patent Literature

Patent Literature 1: Japanese Patent Application Laid-Open (JP-A) No. 2000-141708
Patent Literature 2: JP-A No. 2004-263049
Patent Literature 3: JP-A No. 2007-291399
Patent Literature 4: JP-A No. 2007-031667

DISCLOSURE OF THE INVENTION

According to an embodiment of the present invention, there is provided an ink composition which is used for active energy ray-curable inkjet printing, has excellent curability or adhesiveness to multiple base materials while having low viscosity, and exhibits excellent non-yellowing properties of the printed matter.

The inventors of the present invention conducted a thorough investigation so as to provide an ink composition which is used for active energy ray-curable inkjet printing, has excellent curability or adhesiveness to multiple base materials while having low viscosity, and exhibits excellent non-yellowing properties of the printed matter. As a result, the inventors found that the problems described above are solved by incorporating 2-(2-vinyloxyethoxy)ethyl acrylate (A-1) as a polymerizable monomer (A), oligo(2-hydroxy-2-methyl-1-(4-(1-methylvinyl)phenyl)propanone) (B-1) and a photopolymerization initiator other than oligo(2-hydroxy-2-methyl- 1-(4-(1-methylvinyl)phenyl)propanone) (B-2) as photopolymerization initiators (B), thus completing the present invention.

That is, the embodiments of the present invention relates to the following items (1) to (7).

(1) An active energy ray-curable inkjet ink composition including at least a polymerizable monomer (A) and photopolymerization initiators (B), the ink composition including 2-(2-vinyloxyethoxy)ethyl acrylate (A-1) as a polymerizable monomer (A) and including oligo(2-hydroxy-2-methyl-1-(4-(1-methylvinyl)phenyl)propanone) (B-1) and a photopolymerization initiator other than oligo(2-hydroxy-2-methyl-1-(4-(1-methylvinyl)phenyl)propanone) (B-2) as photopolymerization initiators (B).

(2) The active energy ray-curable inkjet ink composition as described in the item (1), wherein the amount of incorporation of the oligo(2-hydroxy-2-methyl-1-(4-(1-methylvinyl)phenyl)propanone) (B-1) is from 20% to 80% by weight relative to the total amount of the photopolymerization initiators (B).

(3) The active energy ray-curable inkjet ink composition as described in the item (1) or (2), including at least 2,4,6-trimethylbenzoyldiphenylphosphine oxide as the photopolymerization initiator other than the oligo(2-hydroxy-2-methyl-1-(4-(1-methylvinyl)phenyl)propanone) (B-2).

(4) The active energy ray-curable inkjet ink composition as described in any one of the items (1) to (3), wherein the amount of incorporation of the 2-(2-vinyloxyethoxy)ethyl acrylate (A-1) is 33.40 or greater relative to the amount of the polymerizable monomers (A).

(5) The active energy ray-curable inkjet ink composition as described in any one of the items (1) to (4), further including at least one of dipropylene glycol diacrylate, 1,9-nonanediol diacrylate and 1,10-decanediol diacrylate as a polymerizable monomer (A).

(6) The active energy ray-curable inkjet ink composition as described in any one of the items (1) to (5), wherein the total amount of incorporation of dipropylene glycol diacrylate, 1,9-nonanediol diacrylate and 1,10-decanediol diacrylate is 20% or greater relative to the total amount of the polymerizable monomers (A).

(7) The active energy ray-curable inkjet ink composition as described in any one of the items (1) to (6), wherein the ink composition substantially does not include any colorant.

The entirety of the subject matter of Japanese Patent Application No. 2011-072491 filed on Mar. 29, 2011 is incorporated into the disclosure of the present specification by reference.

An ink composition used in active energy ray-curable type inkjet printing, which has excellent curability and adhesiveness to multiple base materials while having low viscosity, and exhibits excellent non-yellowing properties of the printed matter, could be obtained by incorporating 2-(2-vinyloxyethoxy)ethyl acrylate (A-1) as a polymerizable monomer (A), and oligo(2-hydroxy-2-methyl-1-(4-(1-methylvinyl)phenyl)propanone) (B-1) and a photopolymerization initiator other than oligo(2-hydroxy-2-methyl-1-(4-(1-methylvinyl)phenyl)propanone) (B-2) as photopolymerization initiators.

EMBODIMENTS

According to the embodiment of the present invention, when 2-(2-vinyloxyethoxy)ethylacrylate (A-1) is incorporated as a polymerizable monomer (A) into an active energy ray-curable inkjet ink composition, and oligo(2-hydroxy-2-methyl-1-(4-(1-methylvinyl)phenyl)propanone) (B-1) and a photopolymerization initiator other than oligo(2-hydroxy-2-methyl-1-(4-(1-methylvinyl)phenyl)propanone) (B-2) are used in combination as photopolymerization initiators in the ink composition, an ink composition which has excellent curability and adhesiveness to multiple base materials while having low viscosity, and exhibits excellent non-yellowing properties of the printed matter, can be obtained.

Meanwhile, the term "non-yellowing properties" as used herein means that when a printed matter is produced by curing an ink composition, a change of the color tone of the printed matter to yellow as caused by the components included in the ink composition does not occur.

Furthermore, the term "clear ink composition" means that the ink composition or a printed matter thereof is visually colorless and transparent, and the ink composition substantially does not include any colorant.

Oligo(2-hydroxy-2-methyl-1-(4-(1-methylvinyl)phenyl)propanone) (B-1) is a material known as one kind of an α-hydroxyketone-based photopolymerization initiator. As a feature of α-hydroxyketone-based photopolymerization initiators, it is generally known that the peak wavelength in the optical absorption spectrum (hereinafter, described as "optical absorption peak wavelength") is as short as 240 nm to 340 nm. Among these, oligo(2-hydroxy-2-methyl-1-(4-(1-methylvinyl)phenyl)propanone) (B-1) further has a feature of high radical generation efficiency. When oligo(2-hydroxy-2-methyl-1-(4-(1-methylvinyl)phenyl)propanone) (B-1) having these two features in combination is used, the ink composition can have excellent curability and can achieve non-yellowing properties of the printed matter.

However, an ink composition which uses only the oligo(2-hydroxy-2-methyl-1-(4-(1-methylvinyl)phenyl)propanone) (B-1) as a photopolymerization initiator (B) has two problems. One of the problems is that the ink composition may have insufficient curability, depending on the print thickness of the printed matter or the coverage rate. This is attributed to the fact that the ink composition cannot utilize active energy rays having wavelengths other than the optical absorption peak wavelength described above. Another problem is that an ink composition in which oligo(2-hydroxy-2-methyl-1-(4-(1-methylvinyl)phenyl)propanone) (B-1) is dissolved has high viscosity, and the use thereof as an inkjet ink composition is made difficult. This is attributed to the fact that since oligo(2-hydroxy-2-methyl-1-(4-(1-methylvinyl)phenyl)propanone) (B-1) is a polymer having an α-hydroxyketone structure, the molecular weight of the compound is larger relative to generally used photopolymerization initiators.

The two problems described have been solved by two approaches. A first approach is to use a photopolymerization initiator in combination. When another photopolymerization initiator having an optical absorption peak wavelength different from that of the oligo(2-hydroxy-2-methyl-1-(4-(1-methylvinyl)phenyl)propanone) (B-1) is used in combination, active energy rays having wavelengths that are not used up by oligo(2-hydroxy-2-methyl-1-(4-(1-methylvinyl)phenyl)propanone) (B-1) may be effectively utilized, and as a result, the curability of the ink composition can be improved.

When an initiator having an absorption maximum on the shorter wavelength region than the optical absorption peak wavelength of oligo(2-hydroxy-2-methyl-1-(4-(1-methylvinyl)phenyl)propanone) (B-1) is used in combination, the surface curability can be enhanced. Furthermore, when an initiator having an absorption wavelength on the longer wavelength region is used in combination, light absorption by colorants may be suppressed, and thus the internal curability can be enhanced. Examples of an initiator having an absorption maximum on the shorter wavelength region include 2-hydroxy-2-methyl-1-phenylpropan-1-one, and 1-hydroxycyclohexyl phenyl ketone. Examples of an initiator having an absorption maximum on the longer wavelength region include 2,4,6-trimethylbenzoyl diphenylphosphine oxide, and bis(2,4,6-trimethylbenzoyl)-phenylphosphine oxide.

Furthermore, a second approach is to use 2-(2-vinyloxyethoxy)ethyl acrylate (A-1) as a polymerizable monomer. Generally, examples of polymerizable reactive groups in polymerizable monomers include an acrylic group, a methacrylic group, and a vinyl group, and among these, an acrylic group is known to have the highest reactivity. Accordingly, for the purpose of increasing the reactivity of the ink composition, polyfunctional acrylate monomers having plural acrylic groups in one molecule are generally used; however, on the other hand, the monomers have a problem of high viscosity that originates from the intermolecular interaction caused by acrylic groups. Particularly, when it is attempted to use a polyfunctional acrylate monomer in combination with oligo(2-hydroxy-2-methyl-1-(4-(1-methylvinyl)phenyl)propanone) (B-1), the viscosity increases excessively, and the resulting composition becomes unusable as an inkjet ink composition.

In order to address these problems, 2-(2-vinyloxyethoxy)ethyl acrylate (A-1) is used as a polymerizable monomer. This polymerizable monomer (A-1) has one each of an acrylic group and a vinyl group as polymerizable reactive groups in one molecule, so that the compound is characterized by having a very low viscosity such as about 3 mPa·s and being a polyfunctional monomer. For this reason, even if oligo(2-hydroxy-2-methyl-1-(4-(1-methylvinyl)phenyl)propanone) (B-1) is dissolved, an increase in the viscosity of the ink composition can be suppressed, and as a result, an ink composition having excellent inkjet suitability can be obtained. On the other hand, as discussed above, since 2-(2-vinyloxyethoxy)ethyl acrylate (A-1) contains a vinyl group as a polymerizable reactive group, this compound has a problem that the reactivity is inferior as compared with a bifunctional acrylate monomer containing two acrylic groups in one molecule. However, this is solved by using the monomer in combination with the photopolymerization initiators such as described above, and thereby increasing the curability of the ink composition.

As such, in order to solve the problems described above, the presence of 2-(2-vinyloxyethoxy)ethyl acrylate (A-1) as a polymerizable monomer (A), and oligo(2-hydroxy-2-methyl-1-(4-(1-methylvinyl)phenyl)propanone) (B-1) and a photopolymerization initiator other than oligo(2-hydroxy-2-methyl-1-(4-(1-methylvinyl)phenyl)propanone) (B-2) as photopolymerization initiators, is indispensable.

As discussed above, a combined use with the photopolymerization initiators is indispensable for solving the problems. However, in order to allow a system which uses 2-(2-vinyloxyethoxy)ethyl acrylate (A-1) in combination, to exhibit excellent curability irrespective of the print thickness of the printed matter or the coverage rate, the proportion of the oligo(2-hydroxy-2-methyl-1-(4-(1-methylvinyl)phenyl)propanone) (B-1) relative to the total amount of the photopolymerization initiators (B) may be adjusted.

The proportion of the oligo(2-hydroxy-2-methyl-1-(4-(1-methylvinyl)phenyl)propanone) (B-1) relative to the total amount of the photopolymerization initiators (B) contained in the ink composition is preferably 20% to 80% by weight, more preferably 25% to 70% by weight, and particularly preferably 30% to 60% by weight. Here, when the proportion of the oligo(2-hydroxy-2-methyl-1-(4-(1-methylvinyl)phenyl)propanone) (B-1) relative to the total amount of the photopolymerization initiators (B) is 20% by weight or greater, the effect of oligo(2-hydroxy-2-methyl-1-(4-(1-methylvinyl)phenyl)propanone) (B-1) is sufficiently exhibited, and depending on the printed matter, there may be no occurrence of curing failure. On the other hand, when the proportion is 80% by weight or less, the effect of oligo(2-hydroxy-2-methyl-1-(4-(1-methylvinyl)phenyl)propanone) (B-1) is, on the contrary, exhibited to an appropriate extent, and there may be no occurrence of viscosity increases or curing failure such as described above.

Furthermore, the content of the photopolymerization initiators (B) may also be adjusted. The content of the photopolymerization initiators (B) is preferably 5% to 15% by weight, and more preferably 8% to 13% by weight, relative to the total amount of the ink composition. Here, if the total content is 5% by weight or greater, the ink composition has satisfactory curability, and if the total content is 15% by weight or less, the curing rate can be efficiently increased, no solution residue is generated, and satisfactory ejectability is obtained.

In addition, in order to achieve a balance between viscosity and curability, the proportion of 2-(2-vinyloxyethoxy)ethyl acrylate (A-1) with respect to the photopolymerization initiators (B) may be adjusted.

The proportion (weight ratio) of 2-(2-vinyloxyethoxy)ethyl acrylate (A-1) relative to the amount of incorporation of oligo(2-hydroxy-2-methyl-1-(4-(1-methylvinyl)phenyl)propanone) (B-1) is such that when the amount of incorporation of oligo(2-hydroxy-2-methyl-1-(4-(1-methylvinyl)phenyl)propanone) (B-1) is taken as 1, the proportion is preferably 5 to 40, more preferably 7.5 to 30, and particularly preferably 10 to 20. Here, when the proportion of 2-(2-vinyloxyethoxy)ethyl acrylate (A-1) is 5 or greater, the viscosity increase caused by the dissolution of oligo(2-hydroxy-2-methyl-1-(4-(1-methylvinyl)phenyl)propanone) (B-1) is sufficiently compensated by the low viscosity of 2-(2-vinyloxyethoxy)ethyl acrylate (A-1), and as a result, the viscosity of the ink composition does not increase. On the contrary, when the proportion is 40 or less, the effect of oligo(2-hydroxy-2-methyl-1-(4-(1-methylvinyl)phenyl)propanone) (B-1) is sufficiently exhibited, and as a result, the ink composition has satisfactory curability.

As the oligo(2-hydroxy-2-methyl-1-(4-(1-methylvinyl)phenyl)propanone) (B-1) included in the ink composition, conventionally known materials can be used. Specific examples include "ESACURE KIP150" and "ESACURE ONE", all manufactured by Lamberti S.P.A.

The content of oligo(2-hydroxy-2-methyl-1-(4-(1-methylvinyl)phenyl)propanone) (B-1) is preferably 1% to 10% by weight, and more preferably 2% to 8% by weight, relative to the total amount of the ink composition. Here, when the content is 1% by weight or greater, the ink composition has satisfactory curability. When the content is 10% by weight or less, no solution residues are generated, and the ink composition does not undergo a viscosity increase.

As the photopolymerization initiator other than oligo(2-hydroxy-2-methyl-1-(4-(1-methylvinyl)phenyl)propanone) (B-2), any compound can be freely selected from known materials.

Particularly, molecule cleavage type or hydrogen withdrawing type initiators are suitable, and specific examples thereof include benzoin isobutyl ether, 2,4-diethylthioxanthone, 2-isopropylthioxanthone, 2-benzyl-2-dimethylamino-1-(4-morpholinophenyl)-butan-1-one, 2-methyl-1-(4-methylthiophenyl)-2-morpholinopropan-1-one, 1-hydroxycyclohexyl phenyl ketone, 2-hydroxy-2-methyl-1-phenylpropan-1-one, 4-benzoyl-4'-methyl-diphenyl sulfide, 2,4,6-trimethylbenzoyl diphenylphosphine oxide, bis(2,4,6-trimethylbenzoyl)-phenylphosphine oxide, 1,2-octanedione, 1-(4-(phenylthio)-2,2-(O-benzoyloxime)), benzoin ethyl ether, benzyl dimethyl ketal, 1-(4-isopropylphenyl)-2-hydroxy-2-methylpropan-1-one, benzophenone, 4-phenylbenzophenone, and isophthalphenone.

Among these photopolymerization initiators, from the viewpoint that the photopolymerization initiator itself is less yellowish, and a printed matter having excellent non-yellowing properties are obtained, it is preferable to select acylphosphine oxide-based photopolymerization initiators such as 2,4,6-trimethylbenzoyl diphenylphosphine oxide and bis(2, 4,6-trimethylbenzoyl)-phenylphosphine oxide, and it is particularly preferable to select 2,4,6-trimethylbenzoyl diphenylphosphine oxide.

The photopolymerization initiator other than oligo(2-hydroxy-2-methyl-1-(4-(1-methylvinyl)phenyl)propanone) (B-2) may be used singly, or two or more kinds may be used in combination.

The content of the photopolymerization initiator other than oligo(2-hydroxy-2-methyl-1-(4-(1-methylvinyl)phenyl)propanone) (B-2) is preferably 1% to 10% by weight, and more preferably 2% to 8% by weight, relative to the total amount of the ink composition. Here, when the content is 1% by weight or greater, the ink composition has satisfactory curability, and when the content is 10% by weight or less, no solution residues are generated, while the ink composition has satisfactory viscosity. Furthermore, as described above, the content of the photopolymerization initiator other than oligo(2-hydroxy-2-methyl-1-(4-(1-methylvinyl)phenyl)propanone) (B-2) can be set in consideration of the content of the oligo(2-hydroxy-2-methyl-1-(4-(1-methylvinyl)phenyl)propanone) (B-1).

For the photopolymerization initiator other than oligo(2-hydroxy-2-methyl-1-(4-(1-methylvinyl)phenyl)propanone) (B-2), a sensitizer may be used in combination. Examples of the sensitizer include amines such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone. With regard to these sensitizers, it is preferable to select and use a compound having excellent solubility in the ink composition.

Furthermore, in the case of using these sensitizers, the content of the sensitizer is preferably 0.5% to 5% by weight relative to the total amount of the ink composition. When the content is 0.5% by weight or greater, the function as a sensitizer is sufficiently exhibited. When the content is 5% by weight or less, an appropriate amount of sensitizer is used with respect to the photopolymerization initiator so that the ink composition acquires satisfactory curability, and there is no occurrence of yellowing of the printed matter caused by the yellowish tone of the sensitizer itself. Specific examples of 2-(2-vinyloxyethoxy)ethyl acrylate (A-1) include "VEEA" manufactured by Nippon Shokubai Co., Ltd.

The content of 2-(2-vinyloxyethoxy)ethyl acrylate (A-1) is preferably 33.4% by weight or greater, more preferably 35% by weight or greater and 75% by weight or less, and particularly preferably 40% by weight or greater and 60% by weight or less, relative to the total amount of the polymerizable monomers (A). Here, when the content is 33.4% by weight or greater, the viscosity of the ink composition is in a suitable range, and the ink composition has satisfactory curability or adhesiveness. However, as described above, the content of 2-(2-vinyloxyethoxy)ethyl acrylate (A-1) can be set in consideration of the content of oligo(2-hydroxy-2-methyl-1-(4-(1-methylvinyl)phenyl)propanone (B-1).

As the polymerizable monomers (A) other than 2-(2-vinyloxyethoxy)ethyl acrylate (A-1), any material that has already been conventionally known can be used as necessary, but from the viewpoint of acquiring satisfactory curability as described above, it is preferable to use a polymerizable monomer containing an acrylic group or a methacrylic group as a polymerizable reactive group.

Specific examples of the polymerizable monomers (A) include, as monofunctional monomers, benzyl(meth)acrylate, (ethoxylated (or propoxylated)) 2-phenoxyethyl(meth)acrylate, dicyclopentenyl(oxyethyl)(meth)acrylate, phenoxydiethylene glycol(meth)acrylate, 2-methoxyethyl (meth)acrylate, methoxytriethylene glycol(meth)acrylate, 2-ethoxyethyl(meth)acrylate, ethoxyethoxyethyl(meth)acrylate, methoxydipropylene glycol(meth)acrylate, dipropylene glycol(meth)acrylate, β-carboxyethyl(meth)acrylate, trimethylolpropaneformal(meth)acrylate, isoamyl(meth)acrylate, cyclohexyl(meth)acrylate, tetrahydrofurfuryl(meth) acrylate, isoboronyl(meth)acrylate, dicyclopentanyl(meth) acrylate, isooctyl(meth)acrylate, lauryl(meth)acrylate, 2-hydroxy-3-phenoxypropyl(meth)acrylate, 1,4-cyclohexanedimethanol(meth)acrylate, 2-hydroxyethyl(meth)acrylate, 2-hydroxypropyl(meth)acrylate, 4-hydroxybutyl(meth) acrylate, acryloylmorpholine, N-vinylcaprolactam, N-vinylpyrrolidone, N-vinylformamide, and N-acryloyloxyethyl hexahydrophthalimide.

Furthermore, examples of polyfunctional monomers include dimethyloltricyclodecane di(meth)acrylate, (ethoxylate (or propoxylated)) bisphenol A di(meth)acrylate, cyclohexanedimethanol di(meth)acrylate, (poly)ethylene glycol di(meth)acrylate, (ethoxylated (or propoxylated)) 1,6-hexanediol di(meth)acrylate, 1,9-nonanediol diacrylate, 1,10-decanediol diacrylate, (ethoxylated (or propoxylated)) neopentyl glycol di(meth)acrylate, hydroxypivalic acid neopentyl glycol di(meth)acrylate, dipropylene glycol di(meth)acrylate, (neopentyl glycol-modified) trimethylolpropane di(meth)acrylate, tripropylene glycol di(meth)acrylate, dicyclopentanyl di(meth)acrylate, pentaerythritol tri- (or tetra-) (meth)acrylate, trimethylolpropane tri- (or tetra-)(meth)acrylate, tetramethylolmethane tri- (or tetra-)(meth)acrylate, and dipentaerythritol hexa(meth)acrylate. The above materials may be used singly, or two or more kinds may be used in combination.

Among these, it is preferable to select, as a monofunctional monomer, (ethoxylated (or propoxylated)) 2-phenoxyethyl acrylate, ethoxyethoxyethyl acrylate, isoboronyl acrylate, isooctyl acrylate, lauryl acrylate, N-vinylcaprolactam, or N-acryloyloxyethyl hexahydrophthalimide; and as a polyfunctional monomer, dimethyloltricyclodecane diacrylate, (ethoxylated (or propoxylated)) neopentyl glycol diacrylate, hydroxypivalic acid neopentyl glycol diacrylate, 1,6-hexanediol diacrylate, 1,9-nonanediol diacrylate, 1,10-decanediol diacrylate, dipropylene glycol diacrylate, tripropylene glycol diacrylate, or trimethylolpropane triacrylate. Among these, from the viewpoint of having excellent curability and adhesiveness while having low viscosity, dipropylene glycol diacrylate, 1,9-nonanediol diacrylate, or 1,10-decanediol diacrylate is particularly suitably selected.

In the case of selecting dipropylene glycol diacrylate, 1,9-nonanediol diacrylate, or 1,10-decanediol diacrylate as the polymerizable monomer, the total amount of incorporation is preferably 20% by weight or greater, and more preferably 30% by weight or greater and 60% by weight or less, relative to the total amount of the polymerizable monomers (A). Here, when the total amount of incorporation is 20% by weight or greater, the ink composition does not undergo a viscosity increase, and has satisfactory curability. In order to increase the curability of the ink composition or to increase the strength of the printed matter, a monofunctional monomer and a polyfunctional monomer can be used in combination. In this case, the amount of the monofunctional monomer relative to the total amount of the polymerizable monomers is preferably 50% by weight or less, and more preferably 10% to 30% by weight.

In order to impart resistance to the printed matter, oligomers and prepolymers can be used in the ink composition. Specific examples of the oligomers and prepolymers include "Ebecryl 230, 244, 245, 270, 280/151B, 284, 285, 4830, 4835, 4858, 4883, 8402, 8803, 8800, 254, 264, 265, 294/35HD, 1259, 1264, 4866, 9260, 8210, 1290, 1290K, 5129, 2000, 2001, 2002, 2100, KRM7222, KRM7735, 4842, 210, 215, 4827, 4849, 6700, 6700-20T, 204, 205, 6602, 220, 4450, 770, IRR567, 81, 84, 83, 80, 657, 800, 805, 808, 810, 812, 1657, 1810, IRR302, 450, 670, 830, 835, 870, 1830, 1870, 2870, IRR267, 813, IRR483, 811, 436, 438, 446, 505, 524, 525, 554W, 584, 586, 745, 767, 1701, 1755, 740/40TP, 600, 601, 604, 605, 607, 608, 609, 600/25TO, 616, 645, 648, 860, 1606, 1608, 1629, 1940, 2958, 2959, 3200, 3201, 3404, 3411, 3412, 3415, 3500, 3502, 3600, 3603, 3604, 3605, 3608, 3700, 3700-20H, 3700-20T, 3700-25R, 3701, 3701-20T, 3703, 3702, RDX63182, 6040, and IRR419", all manufactured by Daicel-UCB Co., Ltd.; "CN104, CN120, CN124, CN136, CN151, CN2270, CN2271E, CN435, CN454, CN970, CN971, CN972, CN9782, CN981, CN9893, and CN991", all manufactured by Sartomer Co. Inc.; "Laromer EA81, LR8713, LR8765, LR8986, PE56F, PE44F, LR8800, PE46T, LR8907, PO43F, PO77F, PE55F, LR8967, LR8981, LR8982, LR8992, LR9004, LR8956, LR8985, LR8987, UP35D, UA19T, LR9005, PO83F, PO33F, PO84F, PO94F, LR8863, LR8869, LR8889, LR8997, LR8996, LR9013, LR9019, PO9026V, and PE9027V", all manufactured by BASF SE; "PHOTOMER 3005, 3015, 3016, 3072, 3982, 3215, 5010, 5429, 5430, 5432, 5662, 5806, 5930, 6008, 6010, 6019, 6184, 6210, 6217, 6230, 6891, 6892, 6893-20R, 6363, 6572, and 3660", all manufactured by Cognis Corp.; "ART RESIN UN-9000HP, 9000PEP, 9200A, 7600, 5200, 1003, 1255, 3320HA, 3320HB, 3320HC, 3320HS, 901T, 1200TPK, 6060PTM, and 6060P", all manufactured by Negami Chemical Industrial Co., Ltd.; "SHIKOH UV-6630B, 7000B, 7510B, 7461TE, 3000B, 3200B, 3210EA, 3310B, 3500BA, 3520TL, 3700B, 6100B, 6640B, 1400B, 1700B, 6300B, 7550B, 7605B, 7610B, 7620EA, 7630B, 7640B, 2000B, 2010B, 2250EA, and 2750B", all manufactured by Nippon Synthetic Chemical Industry, Co., Ltd.; and "KAYARAD R-280, R-146, R131, R-205, EX2320, R190, R130, R-300, C-0011, TCR-1234, ZFR-1122, UX-2201, UX-2301, UX3204, UX-3301, UX-4101, UX-6101, UX-7101, MAX-5101, MAX-5100, MAX-3510, and UX-4101", all manufactured by Nippon Kayaku Co., Ltd.

In the ink composition, an organic solvent may be incorporated in order to decrease the viscosity and to enhance the wetting spreadability on base materials.

Examples of the organic solvent include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethyl diglycol, diethylene glycol dialkyl ether, tetraethylene glycol dialkyl ether, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate, and dipropylene glycol monomethyl ether butyrate; glycol diacetates such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol acetate dibutyrate, diethylene glycol acetate propionate, diethylene glycol acetate butyrate, diethylene glycol propionate butyrate, diethylene glycol dipropionate, diethylene glycol acetate dibutyrate, propylene glycol acetate propionate, propylene glycol acetate butyrate, propylene glycol propionate butyrate, propylene glycol dipropionate, propylene glycol acetate dibutyrate, dipropylene glycol acetate propionate, dipropylene glycol acetate butyrate, dipropylene glycol propionate butyrate, dipropylene glycol dipropionate, and dipropylene glycol acetate dibutyrate; glycols such as ethylene glycol, diethylene glycol, triethylene glycol, propylene glycol, and dipropylene glycol; glycol ethers such as ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether, and tripropylene glycol monomethyl ether; and lactic acid esters such as methyl lactate, ethyl lactate, propyl lactate, and butyl lactate. Among these, tetraethylene glycol dialkyl ether, ethylene glycol monobutyl ether acetate, and diethyl diglycol are preferred.

When a colorant is incorporated into the ink composition, a dye or a pigment can be used, but from the viewpoint of resistance of the printed matter, a pigment can be more suitably used. As the pigment, a pigment that is generally used in ink compositions for printing applications and coating applications can be used, and can be selected according to the needed applications such as color developability and light resistance. As the pigment component, achromatic pigments such as carbon black, titanium oxide, and calcium carbonate, and chromatic organic pigments can be used. Examples of the organic pigment include insoluble azo pigments such as toluidine red, toluidine maroon, Hansa yellow, benzidine yellow, and pyrazolone red; soluble azo pigments such as lithol red, Helio Bordeaux, pigment scarlet, and permanent red 2B; derivatives of vat dyes such as alizarin, indanthrone, and thioindigo maroon; phthalocyanine-based organic pigments such as phthalocyanine blue and phthalocyanine green; quinacridone-based organic pigments such as quinacridone red and quinacridone magenta; perylene-based organic pigments such as perylene red and perylene scarlet; isoindolinone-based organic pigments such as isoindolinone yellow and isoindolinone orange; pyranthrone-based organic pigments such as pyranthrone red and pyranthrone orange; thioindigo-based organic pigments; condensed azo-based organic pigments; benzimidazolone-based organic pigments; quinophthalone-based organic pigments such as quinophthalone yellow; isoindoline-based organic pigments such as isoindoline yellow; naphthol-based organic pigments; and other pigments such as flavanthrone yellow, acylamide yellow, nickel azo yellow, copper azomethine yellow, perinone orange, anthrone orange, dianthraquinonyl red, and dioxazine violet.

Examples of the organic pigment as indicated by their Color Index (C.I.) numbers include C.I. Pigment Yellow 12, 13, 14, 17, 20, 24, 74, 83, 86, 93, 109, 110, 117, 120, 125, 128, 129, 137, 138, 139, 147, 148, 150, 151, 153, 154, 155, 166, 168, 180, 185; C.I. Pigment Orange 16, 36, 43, 51, 55, 59, 61; C.I. Pigment Red 9, 48, 49, 52, 53, 57, 97, 122, 123, 149, 168, 177, 180, 185, 192, 202, 206, 215, 216, 217, 220, 223, 224, 226, 227, 228, 238, 240, 269; C.I. Pigment Violet 19, 23, 29, 30, 37, 40, 50; C.I. Pigment Blue 15, 15:1, 15:3, 15:4, 15:6, 22, 60, 64; C.I. Pigment Green 7, 36: and C.I. Pigment Brown 23, 25, and 26.

Specific examples of carbon black include "Special Black 350, 250, 100, 550, 5, 4, 4A, and 6", "PRINTEX U, V, 140U, 140V, 95, 90, 85, 80, 75, 55, 45, 40, P, 60, L6, L, 300, 30, 3, 35, 25, A, and G", all manufactured by Degussa AG; "REGAL 400R, 660R, 330R, and 250R", "MOGUL E, and L", all manufactured by Cabot Corp.; and "MA 7, 8, 11, 77, 100, 100R, 1005, 220, and 230", "#2700, #2650, #2600, #200, #2350, #2300, #2200, #1000, #990, #980, #970, #960, #950, #900, #850, #750, #650, #52, #50, #47, #45, #45L, #44, #40, #33, #332, #30, #25, #20, #10, #5, CF9, #95, and #260", all manufactured by Mitsubishi Chemical Corp.

Specific examples of titanium oxide include "TIPAQUE CR-50, 50-2, 57, 80, 90, 93, 95, 953, 97, 60, 60-2, 63, 67, 58, 58-2, and 85", "TIPAQUE R-820, 830, 930, 550, 630, 680, 670, 580, 780, 780-2, 850, and 855", "TIPAQUE A-100, and 220", "TIPAQUE W-10", "TIPAQUE PF-740, and 744", "TTO-55(A), 55(B), 55(C), 55(D), 55(S), 55(N), 51(A), and 51(C)", "TTO-S-1, and 2", "TTO-M-1, and 2", all manufactured by Ishihara Sangyo Kaisha, Ltd.; "TITANIX JR-301, 403, 405, 600A, 605, 600E, 603, 805, 806, 701, 800, and 808", "TITANIX JA-1, C, 3, 4, and 5", all manufactured by Tayca Corp.; and "TI-PURE R-900, 902, 960, 706, and 931", all manufactured by DuPont Co.

Among the pigments described above, quinacridone-based organic pigments, phthalocyanine-based organic pigments, benzimidazole-based organic pigments, isoindolinone-based organic pigments, condensed azo-based organic pigments, quinophthalone-based organic pigments, isoindoline-based organic pigments and the like are preferred because of their excellent light resistance. The organic pigment is preferably a finely powdered pigment having an average particle size of 10 nm to 200 nm as measured by laser scattering. When the average particle size of the pigment is 10 nm or larger, the particle size is in an appropriate range, and thereby, the pigment acquires satisfactory light resistance. When the average particle size is 200 nm or less, the pigment can easily maintain dispersion stability, and precipitation of the pigment does not easily occur.

Micronization of the organic pigment can be carried out by, for example, a method such as described below. That is, a mixture including at least three components such as an organic pigment, a water-soluble inorganic salt in an amount equivalent to three or more times the weight of the organic pigment, and a water-soluble solvent, is prepared as a clay-like mixture, and the mixture is strongly kneaded with a kneader or the like to micronize the components. The kneading product is then introduced into water and is stirred with a high-speed mixer or the like to obtain the mixture in a slurry form. Subsequently, filtration and water washing of the slurry are repeated to remove the water-soluble inorganic salt and the water-soluble solvent. During the process of micronization, a resin, a pigment dispersant and the like may be added to the mixture.

Examples of the water-soluble inorganic salt include sodium chloride and potassium chloride. These inorganic salts are used in an amount in the range of three or more times, and preferably twenty or less times, the weight of the organic pigment. When the amount of the inorganic salt is three or more times the weight of the organic pigment, a treated pigment having a desired size may be obtained. Also, when the amount is twenty or less times the weight of the organic pigment, the washing treatment in the subsequent processes is facilitated, and the substantial throughput of the organic pigment is increased.

The water-soluble solvent is used to make an appropriate clay-like state of the mixture of the organic pigment and the water-soluble inorganic salt that is used as a pulverization aid, and to efficiently carry out sufficient pulverization. There are no particular limitations on the solvent as long as it is soluble in water. However, since the temperature of the mixture increases at the time of kneading, and a condition in which the solvent is easily evaporated is attained, a solvent having a high boiling point such as a boiling point of 120° C. to 250° C. is preferred in view of safety. Examples of the water-soluble solvent include 2-(methoxymethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and low molecular weight polypropylene glycol.

The pigment is preferably incorporated in an amount in the range of 0.1% to 30% by weight based on the ink composition, in order to obtain a sufficient concentration and sufficient light resistance.

In order to enhance dispersibility of the pigment and storage stability of the ink composition, it is preferable to add a pigment dispersant. Examples of the pigment dispersant that can be used include a hydroxyl group-containing carboxylic acid ester, a salt of a long-chain polyaminoamide and a high molecular weight acid ester, a salt of a high molecular weight polycarboxylic acid, a salt of a long-chain polyaminoamide and a polar acid ester, a high molecular weight unsaturated acid ester, a high molecular weight copolymer, a modified polyurethane, a modified polyacrylate, a polyether ester type anionic surfactant, a naphthalenesulfonic acid-formalin condensate salt, an aromatic sulfonic acid-formalin condensate salt, a polyoxyethylene alkyl phosphoric acid ester, polyoxyethylene nonyl phenyl ether, and stearylamine acetate.

Specific examples of the dispersant include "Anti-Terra-U (polyaminoamide phosphate)", "Anti-Terra-203/204 (high molecular weight polycarboxylates)", "Disperbyk-101 (polyaminoamide phosphate and acid ester), 107 (hydroxyl group-containing carboxylic acid ester), 110, 111 (copolymers containing acid groups), 130 (polyamide), 161, 162, 163, 164, 165, 166, 170 (high molecular weight copolymers)", "400", "Bykumen" (high molecular weight unsaturated acid ester), "BYK-P104, P105 (high molecular weight unsaturated acid polycarboxylic acids)", "P104S, 240S (high molecular weight unsaturated acid polycarboxylic acid and silicone systems)", and "Lactimon (long-chain amine, unsaturated acid polycarboxylic acid and silicone)", all manufactured by BYK-Chemie GmbH.

Other examples include "EFKA 44, 46, 47, 48, 49, 54, 63, 64, 65, 66, 71, 701, 764, and 766", "EFKA POLYMER 100 (modified polyacrylate), 150 (aliphatic-modified polymer), 400, 401, 402, 403, 450, 451, 452, 453 (modified polyacrylates), and 745 (copper phthalocyanine-based)", all manufactured by Efka Chemicals B.V.; "FLOWLEN TG-710 (urethane oligomer)", "FLOWNON SH-290, SP-1000", and "POLYFLOW No. 50E, No. 300 (acrylic copolymers)", all manufactured by Kyoeisha Chemical Co., Ltd.; and "DISPARLON KS-860, 873SN, 874 (polymeric dispersants), #2150 (aliphatic polyvalent carboxylic acid), and #7004 (polyether ester type)", all manufactured by Kusumoto Chemicals, Ltd.

Further examples include "DEMOL RN, N (naphthalenesulfonic acid-formalin condensate sodium salts), MS, C, SN-B (aromatic sulfonic acid-formalin condensate sodium salts), EP", "HOMOGENOL L-18 (polycarboxylic acid type polymer)", "EMULGEN 920, 930, 931, 935, 950, 985 (polyoxyethylene nonyl phenyl ethers)", and "ACETAMIN 24 (coconut amine acetate), 86 (stearylamine acetate)", all manufactured by Kao Corp.; "SOLSPERSE 5000 (phthalocyanine ammonium salt-based), 13940 (polyester amine-based), 17000 (fatty acid amine-based), 24000GR, 32000, 33000, 35000, 39000, 41000, and 53000", all manufactured by Lubrizol Corp.; "NIKKOL T106 (polyoxyethylene sorbitan monooleate), MYS-IEX (polyoxyethylene monostearate), and HEXAGLINE 4-0 (hexaglyceryl tetraoleate)", all manufactured by Nikko Chemicals Co., Ltd.; "AJISPER-PB821, 822, 824, 827 and 711", manufactured by Ajinomoto Fine Techno Co., Inc.; and "TEGO DISPER 685" manufactured by Tego Chemie Service GmbH.

It is preferable that the dispersant be included in the ink composition in an amount of 0.01% to 10% by weight.

It is preferable that an acidic derivative of an organic pigment be incorporated into the ink composition at the time of dispersing the pigment, in order to further enhance dispersibility of the pigment and storage stability of the ink composition. In the case of incorporating a colorant into the ink composition, it is preferable to thoroughly disperse polymerizable monomers, a pigment dispersant, a pigment, and additives in advance using a conventional dispersing machine such as a sand mill, thereby preparing a liquid concentrate containing a pigment at a high concentration, and then diluting the liquid concentrate with the remaining polymerizable monomers. Through this method, sufficient dispersion can be achieved even in a dispersing process using a conventional dispersing machine. Furthermore, since an excess of dispersion energy is not applied, and enormous dispersion time is not required, an ink composition having excellent stability can be prepared without causing degradation of the raw materials during the dispersion process.

In order to increase storage stability of the ink composition or to increase stability in a recording apparatus, it is preferable to use a polymerization inhibitor such as 4-methoxyphenol, hydroquinone, methylhydroquinone, t-butylhydroquinone, 2,5-di-t-butyl-4-methylphenol, phenothiazine, or an aluminum salt of N-nitrosophenylhydroxylamine. From the viewpoint of enhancing stability while maintaining curability, it is preferable to incorporate the polymerization inhibitor at a proportion of 0.01 parts to 5 parts by weight relative to the total amount of the ink composition.

In the ink composition, additives such as a surface adjusting agent, a leveling agent, an ultraviolet absorber, and an oxidation inhibitor can be used as necessary, in order to increase print suitability or print durability.

When the ink composition is intended to contain polymerizable monomers (A), photopolymerization initiators (B), additives and a colorant, the ink composition is prepared by adding and mixing the liquid pigment concentrate described above, and dissolving the photopolymerization initiators therein. At this time, in order to prevent clogging at the head, it is preferable to filter the ink composition, after the photopolymerization initiators are dissolved therein, through a filter having a pore size of 3 μm or less, and preferably a pore size of 1 μm or less.

The ink composition is such that it is preferable to adjust the viscosity at 25° C. to 5 mPa·s to 50 mPa·s, more preferably to 5 mPa·s to 30 mPa·s, and particularly preferably to 5 mPa·s to 15 mPa·s. In this range of viscosity, the ink composition exhibits stabilized ejection characteristics in heads, particularly ranging from a head having a conventional frequency of 5 kHz to 30 kHz, to a head having a high frequency of 10 kHz to 50 kHz. Here, when the viscosity is 5 mPa·s or higher, the ink composition does not exhibit a decrease in the conformity with ejection even in a high-frequency head. When the viscosity is 50 mPa·s or lower, there is no reduction of ejection, and the ink composition has high ejection stability.

Furthermore, when a piezo head is used, the conductivity of the ink composition is preferably adjusted to 10 μS/cm or less, so as to obtain an ink which does not cause electrolytic corrosion in the interior of the head. Furthermore, in a continuous type head, it is necessary to adjust conductivity by using an electrolyte, and in this case, it is necessary to adjust the conductivity to 0.5 mS/cm or higher.

When the ink composition is put to use, first, this ink composition is supplied to the printer head of a printer for the inkjet recording system, and is ejected from the printer head onto a base material. Thereafter, the ink composition is irradiated with an active energy ray such as ultraviolet radiation or an electron beam. Thereby, the ink composition on a printing medium rapidly cures.

Meanwhile, in the case of irradiating ultraviolet radiation as a light source of the active energy ray, for example, a high pressure mercury lamp, a metal halide lamp, a low pressure mercury lamp, an ultrahigh pressure mercury lamp, an ultraviolet laser, a light-emitting diode (LED), and solar radiation can be used.

There are no particular limitations on the printing base material, but examples thereof include plastic base materials such as polycarbonate, rigid polyvinyl chloride, plasticized polyvinyl chloride, polystyrene, expanded synthetic resins, polymethyl methacrylate (PMMA), polypropylene, polyethylene, and polyethylene terephthalate (PET); mixtures or modification products thereof; paper base materials such as high-quality paper, art paper, coated paper, and cast coated paper; glass; and metal base materials such as stainless steel.

EXAMPLES

Hereinafter, the embodiment of the present invention will be more specifically described by way of Examples and Comparative Examples, but the embodiments of the present invention are not intended to be limited to these examples. Furthermore, in the following descriptions, the unit "parts" represents "parts by weight" in all cases. The detailed conditions for Examples and Comparative Examples described below are presented in the following Table 1, and the results are presented in Table 2.

(Preparation of Pigment Dispersion A)

Pigment: Carbon Black Pigment (Manufactured by Degussa AG)

| | |
|---|---:|
| "Special Black 350" | 30.0 parts |
| Pigment dispersant: SOLSPERSE 32000 (manufactured by Lubrizol Corp.) | 6.0 parts |
| Monomer: 1,9-Nonanediol diacrylate | 64.0 parts |

The pigment dispersion was prepared by stirring the above-described materials using a high-speed mixer or the like until a uniform state was obtained, and then dispersing a mill base thus obtained using a horizontal sand mill for about one hour.

(Preparation of Pigment Dispersion B)
Pigment: Phthalocyanine Pigment (Manufactured by Toyo Ink Manufacturing Co., Ltd.)

| | |
|---|---|
| "LIONOL BLUE FG-7400G" | 15.0 parts |
| Pigment dispersant: "SOLSPERSE 32000" manufactured by Lubrizol Corp. | 4.5 parts |
| Monomer: 1,9-Nonanediol diacrylate | 80.5 parts |

The pigment dispersion was prepared by stirring the above-described materials using a high-speed mixer or the like until a uniform state was obtained, and then dispersing a mill base thus obtained using a horizontal sand mill for about one hour.

Example 1

The materials described in Table 1 were sequentially added and mixed while the materials were stirred, and the mixture was gently mixed until the polymerization initiators were dissolved. Subsequently, the mixture was filtered through a membrane filter having a pore size of 1 μm to remove coarse particles, and thus an inkjet ink composition was obtained.

Example 2 to Example 19

Inkjet ink compositions were prepared as indicated in Table 1, in the same manner as in Example 1.

Comparative Example 1 to Comparative Example 4

Inkjet ink compositions were prepared as indicated in Table 1, in the same manner as in Example 1.

(Curability Test)
Each of the ink compositions thus prepared was used to perform ejection on a PET plate, using an inkjet ejection apparatus equipped with a piezo system head manufactured by Konica Minolta IJ Technologies, Inc., such that the print thickness at the time of ejection would be 12 μm. Immediately after the ejection, the ejected ink composition was irradiated with ultraviolet radiation using a single metal halide lamp (output power 120 W/cm) manufactured by Harison Toshiba Lighting Corp., and the maximum conveyor speed that is capable of curing the printed matter by a single pass was investigated. The evaluation criteria in this case were all as described below, and ink compositions rated as Δ or higher were considered to have satisfactory curability.

◉ : The maximum conveyor speed is 40 m/min or higher.
○: The maximum conveyor speed is equal to or higher than 30 m/min and lower than 40 m/min.
○Δ: The maximum conveyor speed is equal to or higher than 20 m/min and lower than 30 m/min.
Δ: The maximum conveyor speed is equal to or higher than 10 m/min and lower than 20 m/min.
X: The ink composition does not cure even at a conveyor speed of 10 m/min.

(Adhesiveness Test)
First, each of the ink compositions thus prepared was used to perform ejection on a PET plate and a polyvinyl chloride plate, using an inkjet ejection apparatus equipped with a piezo system head manufactured by Konica Minolta IJ Technologies, Inc., such that the print thickness at the time of ejection would be 12 μm. Immediately after the ejection, the ejected ink composition was cured by irradiating with ultraviolet radiation by a single pass using a single metal halide lamp (output power 120 W/cm) manufactured by Harison Toshiba Lighting Corp., at a conveyor speed of 10 m/min. Thus, a film was obtained.

The films of the ink compositions were subjected to an evaluation of adhesiveness under the cross-cut conditions. The test was carried out by attaching a Cellophane adhesive tape to a film which had been cross-cut at an interval of 1 mm into 100 grid squares, rubbing the surface with an eraser to secure sufficient adhesion of the Cellophane adhesive tape to the applied surface, and then peeling the Cellophane adhesive tape at 90°. The adhesiveness was determined from the degree of adhesion of the film to the base material after the peeling of the Cellophane adhesive tape. The evaluation criteria were as described below, and samples rated as Δ or higher were considered to have satisfactory adhesiveness.

◉ : No peeling is observed in any of the 100 grid squares.
○: Peeling occurred in equal to or more than 1 grid square and fewer than 25 grid squares among the 100 grid squares.
Δ: Peeling occurred in equal to or more than 25 grid squares and fewer than 50 grid squares among the 100 grid squares.
X: Peeling occurred in equal to or more than 50 grid squares among the 100 grid squares.

(Non-Yellowing Properties)
The films prepared on PET plates in the adhesive test described above were subjected to an evaluation of non-yellowing properties, by measuring the color (b* value) by Hunter's calculation method, using a 528 spectrodensitometer manufactured by X-Rite, Inc. and a light source of D50 at a viewing angle of 2°. The evaluation criteria in this case were as described below, and ink compositions rated as Δ or higher were considered to have satisfactory whiteness. Meanwhile, the evaluation of non-yellowing properties was carried out with clear ink compositions only, so as to exclude the influence of colorants.

◉ : The b* value is lower than −4.
○: The b* value is equal to or higher than −4 and lower than −3.
Δ: The b* value is equal to or higher than −3 and lower than −2.
X: The b* value is −2 or higher.

The evaluation results for the ink compositions prepared in Examples 1 to 19 and Comparative Examples 1 to 4 are presented in Table 2.

Examples 1 to 19 are ink compositions containing 2-(2-vinyloxyethoxy)ethyl acrylate (A-1) as a polymerizable monomer (A) and containing oligo(2-hydroxy-2-methyl-1-(4-(1-methylvinyl)phenyl)propanone) (B-1) and a photopolymerization initiator other than oligo(2-hydroxy-2-methyl-1-(4-(1-methylvinyl)phenylpropapnone (B-2) as photopolymerization initiators (B). Thus, satisfactory results were obtained in terms of all of curability, adhesiveness, and non-yellowing properties.

Among these, Examples 1 to 5 and Examples 16 to 19 are ink compositions containing 2-(2-vinyloxyethoxy)ethyl acrylate (A-1) in an amount of 33.4% or more with respect to the polymerizable monomers (A), and dipropylene glycol diacrylate, 1,9-nonanediol diacrylate, or 1,10-decanediol diacrylate in an amount of 20% by weight or more relative to the total amount of the polymerizable monomers (A). Thus, the ink compositions were rated as ○ or higher in all of curability, adhesiveness, and non-yellowing properties, and thus, very satisfactory evaluation results were obtained. Also, very satisfactory results were obtained for Examples 16 to 19, which are systems containing a colorant. Therefore, it is verified that the combinations of the polymerizable monomers and the photopolymerization initiators of the embodiment of the invention effectively contribute to the qualities described above, irrespective of the presence or absence of a colorant.

Examples 6, 8, and 9 are systems which do not contain dipropylene glycol diacrylate, 1,9-nonanediol diacrylate, or 1,10-decanediol diacrylate, or contain the compounds at a content of less than 20% by weight relative to the total amount of the polymerization monomers (A). In these Examples, satisfactory results were obtained, but in Examples 1 to 4, more satisfactory results were obtained in terms of curability or adhesiveness. The reason for this is not clearly understood, but it is suggested that these polymerizable monomers contribute to an enhancement of curability or adhesiveness.

Furthermore, Example 7 is a system in which the amount of incorporation of 2-(2-vinyloxyethoxy)ethyl acrylate (A-1) is less than 33.4% by weight relative to the total amount of the polymerizable monomers (A). In this Example, satisfactory results were obtained, but in Examples 1 to 5, even more satisfactory results were obtained in terms of curability, adhesiveness, and non-yellowing properties. It is contemplated that it is because the amount of incorporation of 2-(2-vinyloxyethoxy)ethyl acrylate (A-1) needed for the expression of the above-mentioned properties is sufficient.

Examples 10 to 15 are systems in which the photopolymerization initiators have been altered as compared with the formulation for polymerizable monomers of Example 2. Among these, Examples 10 to 12 are systems containing oligo(2-hydroxy-2-methyl-1-(4-(1-methylvinyl)phenyl)propanone) (B-1) in an amount of 20% to 80% by weight relative to the total amount of the photopolymerization initiators, and containing 2,4,6-trimethylbenzoyl diphenylphosphine oxide as the photopolymerization initiator other than oligo(2-hydroxy-2-methyl-1-(4-(1-methylvinyl)phenyl)propanone) (B-2). As a result of the evaluations, the ink compositions were rated as ○ or higher in terms of both curability and adhesiveness, and very satisfactory evaluation results were obtained.

Examples 13 to 15 are systems which use photopolymerization initiators other than 2,4,6-trimethylbenzoyl diphenylphosphine oxide, as the photopolymerization initiator other than oligo(2-hydroxy-2-methyl-1-(4-(1-methylvinyl)phenyl)propanone) (B-2). In these Examples, satisfactory results were obtained, but in Examples 10 to 12, even more satisfactory results were obtained in terms of non-yellowing properties. It is contemplated that it is because 2,4,6-trimethylbenzoyl diphenylphosphine oxide used in Examples 10 to 12 which is compared to the photopolymerization initiators used in Examples 13 to 15 is such that the yellowing tone of the polymerization initiator itself is insignificant.

On the other hand, Comparative Examples 1 and 2 are systems which do not contain oligo(2-hydroxy-2-methyl-1-(4-(1-methylvinyl)phenyl)propanone) (B-1) or a photopolymerization initiator other than oligo(2-hydroxy-2-methyl-1-(4-(1-methylvinyl)phenyl)propanone) (B-2) as the photopolymerization initiators (B). As a result of the evaluations, the ink compositions exhibited insufficient curability, or even if cured, exhibited insufficient adhesiveness. It is contemplated that in Comparative Example 1, the photopolymerization initiator other than oligo(2-hydroxy-2-methyl-1-(4-(1-methylvinyl)phenyl)propanone) (B-2) was left out, while in Comparative Example 2, oligo(2-hydroxy-2-methyl-1-(4-(1-methylvinyl)phenyl)propanone) (B-1) was left out, and therefore, the ink compositions had insufficient curability or adhesiveness.

Furthermore, Comparative Examples 3 and 4 are systems which do not contain 2-(2-vinyloxyethoxy)ethylacrylate (A-1) as a polymerizable monomer (A). As a result of the evaluations, the ink compositions exhibited insufficient curability, or even if cured, exhibited insufficient adhesiveness.

From the results described above, it has been verified that in order to obtain an ink composition having excellent curability or adhesiveness, it is an essential condition to use 2-(2-vinyloxyethoxy)ethyl acrylate (A-1) as a polymerizable monomer (A), and to use oligo(2-hydroxy-2-methyl-1-(4-(1-methylvinyl)phenyl)propanone) (B-1) and a photopolymerization initiator other than oligo(2-hydroxy-2-methyl-1-(4-(1-methylvinyl)phenyl)propanone) (B-2) in combination as photopolymerization initiators (B).

TABLE 1

Raw materials of ink compositions and amounts of incorporation thereof

| | | | Ex. 1 | Ex. 2 | Ex. 3 | Ex. 4 | Ex. 5 | Ex. 6 |
|---|---|---|---|---|---|---|---|---|
| | Pigment dispersion | Pigment dispersion A | | | | | | |
| | | Pigment dispersion B | | | | | | |
| Polymerizable monomer (A) | 2-(2-Vinyloxyethoxy)ethyl acrylate (A-1) | VEEA | 40.0 | 40.0 | 40.0 | 60.0 | 40.0 | 35.0 |
| | Polyfunctional monomer | Dipropylene glycol diacrylate | 30.0 | | | 20.0 | | |
| | | 1,9-Nonanediol diacrylate | | 30.0 | | | | |
| | | 1,10-Decanediol diacrylate | | | 30.0 | | 30.0 | |
| | | Tripropylene glycol diacrylate | | | | | | 40.0 |
| | | Tricyclodecanedimethanol diacrylate | 30.0 | 30.0 | 30.0 | | | |
| | | Neopentyl glycol-modified trimethylolpropane diacrylate | | | | | | 25.0 |
| | | Ethoxylated bisphenol A diacrylate | | | | 20.0 | 10.0 | |
| | | Trimethylolpropane triacrylate | | | | | | |
| | | Dipentaerythritol hexaacrylate | | | | | | |
| | Monofunctional monomer | Vinylcaprolactam | | | | | | |
| | | Lauryl acrylate | | | | | 20.0 | |
| Photopolymerization initiator (B) | Oligo(2-hydroxy-2-methyl-1-(4-(1-methylvinyl)phenyl)propanone) (B-1) | ESACURE ONE | 4.0 | 4.0 | 4.0 | 6.0 | 4.0 | 6.0 |
| | Photopolymerization initiator other than oligo(2-hydroxy-2-methyl-1-(4-(1-methylvinyl)phenyl)propanone) (B-2) | Lucirin TPO | 6.0 | 6.0 | 6.0 | 4.0 | 4.0 | 6.0 |
| | | IRGACURE 184 | | | | | 4.0 | |
| | | IRGACURE 369 | | | | | | |
| | | IRGACURE 819 | | | | | | |
| | | IRGACURE 907 | | | | | | 2.0 |
| | | DAROCUR 1173 | | | | | | |
| | Additive | 2,5-t-butyl-4-methylphenol | 1.0 | 1.0 | 1.0 | 1.0 | 1.0 | 1.0 |

TABLE 1-continued

Raw materials of ink compositions and amounts of incorporation thereof

| | | | Ex. 7 | Ex. 8 | Ex. 9 | Ex. 10 | Ex. 11 | Ex. 12 |
|---|---|---|---|---|---|---|---|---|
| | Pigment dispersion | Pigment dispersion A | | | | | | |
| | | Pigment dispersion B | | | | | | |
| Polymerizable monomer (A) | 2-(2-Vinyloxyethoxy)ethyl acrylate (A-1) | VEEA | 20.0 | 60.0 | 85.0 | 40.0 | 40.0 | 40.0 |
| | Polyfunctional monomer | Dipropylene glycol diacrylate | | 15.0 | | | | |
| | | 1,9-Nonanediol diacrylate | 30.0 | | | 30.0 | 30.0 | 300 |
| | | 1,10-Decanediol diacrylate | | | | | | |
| | | Tripropylene glycol diacrylate | | | | | | |
| | | Tricyclodecanedimethanol diacrylate | 30.0 | | | 30.0 | 30.0 | 30.0 |
| | | Neopentyl glycol-modified trimethylpropane diacrylate | | | | | | |
| | | Ethoxylated bisphenol A diacrylate | | | | | | |
| | | Trimethylolpropane triacrylate | | 25.0 | | | | |
| | | Dipentaerythritol hexaacrylate | | | 15.0 | | | |
| | Monofunctional monomer | Vinylcaprolactam | 20.0 | | | | | |
| | | Lauryl acrylate | | | | | | |
| Photopolymerization initiator (B) | Oligo(2-hydroxy-2-methyl-1-(4-(1-methylvinyl)phenyl)propanone) (B-1) | ESACURE ONE | 4.0 | 3.0 | 2.0 | 2.0 | 8.0 | 3.0 |
| | Photopolymerization initiator other than oligo(2-hydroxy-2-methyl-1-(4-(1-methylvinyl)phenyl)propanone) (B-2) | Lucirin TPO | 8.0 | 5.0 | 4.0 | 8.0 | 2.0 | 4.0 |
| | | IRGACURE 184 | | | | | | 3.0 |
| | | IRGACURE 369 | | | | | | |
| | | IRGACURE 819 | | | | | | |
| | | IRGACURE 907 | | | | | | |
| | | DAROCUR 1173 | | | | | | |
| Additive | | 2,5-t-butyl-4-methylphenol | 1.0 | 1.0 | 1.0 | 1.0 | 1.0 | 1.0 |

| | | | Ex. 13 | Ex. 14 | Ex. 15 | Ex. 16 | Ex. 17 | Ex. 18 |
|---|---|---|---|---|---|---|---|---|
| | Pigment dispersion | Pigment dispersion A | | | | 25.0 | 25.0 | |
| | | Pigment dispersion B | | | | | | 15.0 |
| Polymerizable monomer (A) | 2-(2-Vinyloxyethoxy)ethyl acrylate (A-1) | VEEA | 40.0 | 40.0 | 40.0 | 50.0 | 50.0 | 45.0 |
| | Polyfunctional monomer | Dipropylene glycol diacrylate | | | | 40.0 | | 40.0 |
| | | 1,9-Nonanediol diacrylate | 30.0 | 30.0 | 300 | | 400 | |
| | | 1,10-Decanediol diacrylate | | | | | | |
| | | Tripropylene glycol diacrylate | | | | | | |
| | | Tricyclodecanedimethanol diacrylate | 30.0 | 30.0 | 300 | 10.0 | 10.0 | 15.0 |
| | | Neopentyl glycol-modified trimethylpropane diacrylate | | | | | | |
| | | Ethoxylated bisphenol A diacrylate | | | | | | |
| | | Trimethylolpropane triacrylate | | | | | | |
| | | Dipentaerythritol hexaacrylate | | | | | | |
| | Monofunctional monomer | Vinylcaprolactam | | | | | | |
| | | Lauryl acrylate | | | | | | |
| Photopolymerization initiator (B) | Oligo(2-hydroxy-2-methyl-1-(4-(1-methylvinyl)phenyl)propanone) (B-1) | ESACURE ONE | 3.0 | 4.0 | 4.0 | 4.0 | 4.0 | 4.0 |
| | Photopolymerization initiator other than oligo(2-hydroxy-2-methyl-1-(4-(1-methylvinyl)phenyl)propanone) (B-2) | Lucirin TPO | | | | 6.0 | 6.0 | 4.0 |
| | | IRGACURE 184 | 3.0 | 3.0 | | | | |
| | | IRGACURE 369 | 4.0 | | | 3.0 | 3.0 | 4.0 |
| | | IRGACURE 819 | | 3.0 | 3.0 | | | |
| | | IRGACURE 907 | | | | | | |
| | | DAROCUR 1173 | | | 3.0 | | | |
| Additive | | 2,5-t-butyl-4-methylphenol | 1.0 | 1.0 | 1.0 | 1.0 | 1.0 | 1.0 |

| | | | Ex. 19 | Com. Ex. 1 | Com. Ex. 2 | Com. Ex. 3 | Com. Ex. 4 |
|---|---|---|---|---|---|---|---|
| | Pigment dispersion | Pigment dispersion A | | | | | |
| | | Pigment dispersion B | 15.0 | | | | |
| Polymerizable monomer (A) | 2-(2-Vinyloxyethoxy)ethyl acrylate (A-1) | VEEA | 45.0 | 40.0 | 40.0 | | |
| | Polyfunctional monomer | Dipropylene glycol diacrylate | | | | 40.0 | |
| | | 1,9-Nonanediol diacrylate | 400 | 30.0 | 30.0 | | 400 |
| | | 1,10-Decanediol diacrylate | | | | | |
| | | Tripropylene glycol diacrylate | | | | | 30.0 |
| | | Tricyclodecanedimethanol diacrylate | 15.0 | 30.0 | 30.0 | 20.0 | |
| | | Neopentyl glycol-modified trimethylpropane diacrylate | | | | | |

TABLE 1-continued

Raw materials of ink compositions and amounts of incorporation thereof

|  |  |  |  |  |  |  |  |
|---|---|---|---|---|---|---|---|
|  | Monofunctional monomer | Ethoxylated bisphenol A diacrylate |  |  |  |  |  |
|  |  | Trimethylolpropane triacrylate |  |  |  |  |  |
|  |  | Dipentaerythritol hexaacrylate |  |  |  |  |  |
|  |  | Vinylcaprolactam |  |  |  |  | 300 |
|  |  | Lauryl acrylate |  |  |  | 40.0 |  |
| Photo-polymerization initiator (B) | Oligo(2-hydroxy-2-methyl-1-(4-(1-methylvinyl)phenyl)propanone) (B-1) | ESACURE ONE | 4.0 | 10.0 |  | 4.0 | 5.0 |
|  | Photopolymerization initiator other than oligo(2-hydroxy-2-methyl-1-(4-(1-methylvinyl)phenyl)propanone) (B-2) | Lucirin TPO | 4.0 |  | 5.0 | 8.0 | 5.0 |
|  |  | IRGACURE 184 |  |  | 5.0 |  |  |
|  |  | IRGACURE 369 | 4.0 |  |  |  |  |
|  |  | IRGACURE 819 |  |  |  |  |  |
|  |  | IRGACURE 907 |  |  |  |  |  |
|  |  | DAROCUR 1173 |  |  |  |  |  |
| Additive |  | 2,5-t-butyl-4-methylphenol | 1.0 | 1.0 | 1.0 | 1.0 | 1.0 |

Note)
ESACURE ONE Oligo(2-hydroxy-2-methyl-1-(4-(1-methylvinyl)phenyl)propanone)
Lucirin TPO 2,4,6-Trimethylbenzoyl diphenylphosphine oxide
IRGACURE 184 1-Hydroxycyclohexyl phenyl ketone
IRGACURE 369 2-Benzyl-2-dimethylamino-1-(4-morpholinophenyl)-butan-1-one
IRGACURE 819 Bis(2,4,6-trimethylbenzoyl)phenylphosphine oxide
IRGACURE 907 2-Methyl-1-(4-methylthiophenyl)-2-morpholinopropan-1-one
DAROCUR 1173 2-Hydroxy-2-methyl-1-phenylpropan-1-one

TABLE 2

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
|  | Curability | ⊙ | ⊙ | ⊙ | ○ | ○ | ○ | ○Δ | ○ | ○ | ⊙ | ○ | ○ |
| Adhesiveness | PET plate | ○ | ○ | ○ | ○ | ○ | ○ | Δ | ○ | Δ | ○ | ○ | ○ |
|  | Polyvinyl chloride plate | ○ | ○ | ○ | ○ | ○ | Δ | Δ | Δ | Δ | ○ | ○ | ○ |
| Non-yellowing properties |  | ○ | ○ | ○ | ○ | ○ | ○ | Δ | ○ | ○ | ○ | ○ | ○ |

|  |  | Ex. 13 | Ex. 14 | Ex. 15 | Ex. 16 | Ex. 17 | Ex. 18 | Ex. 19 | Com. Ex. 1 | Com. Ex. 2 | Com. Ex. 3 | Com. Ex. 4 |
|---|---|---|---|---|---|---|---|---|---|---|---|---|
|  | Curability | ○ | ○Δ | ○ | ⊙ | ⊙ | ⊙ | ⊙ | Δ | X | X | Δ |
| Adhesiveness | PET plate | ○ | ○ | ○ | ○ | ○ | ○ | ○ | X | *2 | X | X |
|  | Polyvinyl chloride plate | ○ | ○ | ○ | ○ | ○ | ○ | ○ | X | *2 | Δ | ○ |
| Non-yellowing properties |  | Δ | Δ | Δ | *1 | *1 | *1 | *1 | ○ | *2 | ○ | Δ |

Note)
*1: Since Examples 16 to 19 are systems containing colorants, these compositions were not subjected to the evaluation on non-yellowing properties.
*2: In Comparative Example 2, because the ejected ink composition did not cure, the evaluations on adhesiveness and non-yellowing properties were not carried out.

The active energy ray-curable inkjet ink composition of the embodiment of the invention is an ink composition which has excellent curability and excellent adhesiveness to multiple base materials while having low viscosity, and exhibits excellent non-yellowing properties of the printed matter. Therefore, the active energy ray-curable inkjet ink composition can be utilized in, for example, inkjet printing for technical applications or industrial applications.

What is claimed is:

1. An active energy ray-curable inkjet ink composition, comprising:
   a polymerizable monomer; and
   at least two photopolymerization initiators,
   wherein:
   the polymerizable monomer comprises 2-(2-vinyloxyethoxy)ethyl acrylate;
   the at least two photopolymerization initiators comprise oligo(2-hydroxy-2-methyl-1-(4-(1-methylvinyl)phenyl)propanone) and 2,4,6-trimethylbenzoyldiphenylphosphine oxide; and
   oligo(2-hydroxy-2-methyl-1-(4-(1-methylvinyl)phenyl)propanone) is present in an amount of 20 to 80% by weight relative to a total amount of photopolymerization initiators.

2. The active energy ray-curable inkjet ink composition according to claim 1, wherein 2-(2-vinyloxyethoxy)ethyl acrylate is present in an amount of 33.4% by weight or more relative to a total amount of the polymerizable monomer.

3. The active energy ray-curable inkjet ink composition according to claim 1, wherein the polymerizable monomer further comprises at least one monomer selected from the group consisting of dipropylene glycol diacrylate, 1,9-nonanediol diacrylate and 1,10-decanediol diacrylate.

4. The active energy ray-curable inkjet ink composition according to claim 3, wherein a total amount of dipropylene glycol diacrylate, 1,9-nonanediol diacrylate and 1,10-decanediol diacrylate is 20% by weight or more relative to a total amount of the polymerizable monomers.

5. The active energy ray-curable inkjet ink composition according to claim 1, wherein the ink composition is substantially free of colorant.

* * * * *